United States Patent Office 3,458,923
Patented Aug. 5, 1969

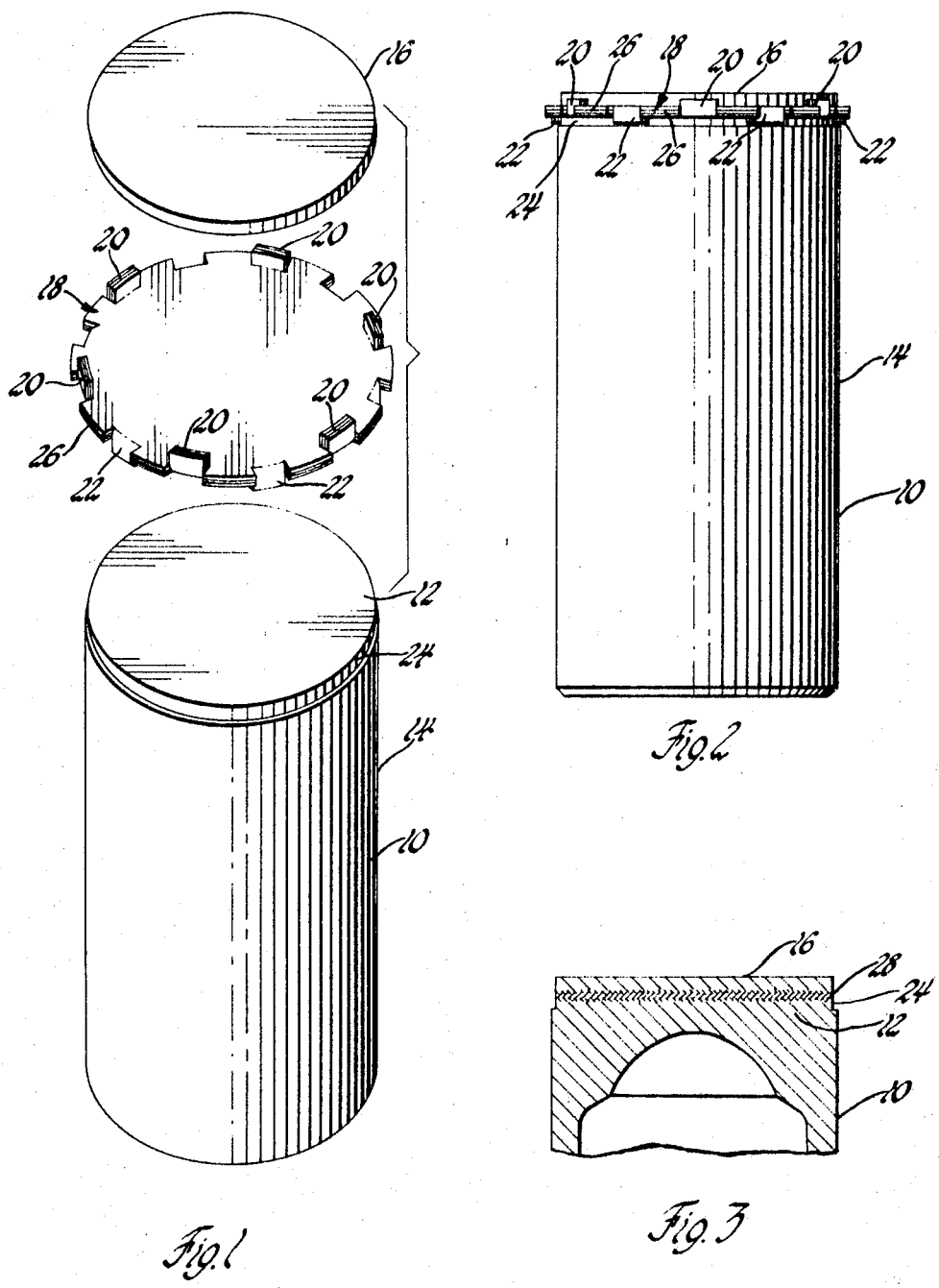

3,458,923
METHOD OF MAKING A VALVE LIFTER
Donald J. Hoffman, Grand Rapids, Mich., assignor to General Motors Corporation, Detroit, Mich., a corporation of Delaware
Filed Oct. 7, 1966, Ser. No. 585,104
Int. Cl. F01l 1/00; B23k 1/04
U.S. Cl. 29—501                                      4 Claims

ABSTRACT OF THE DISCLOSURE

A method of brazing together two metallic members is disclosed. In a preferred embodiment a filler metal member in the form of a sheet or disc is provided having a plurality of alternately upwardly and downwardly directed tangs at its periphery. The filler metal is interposed between the members to be joined in sandwich form, the tangs being employed to assist in locating and maintaining the members in a desired relationship until the brazing operation is accomplished.

---

This invention relates to a method of employing a filler metal in the metallurgical joining of two members. More specifically, it relates to a method of joining such members wherein the filler metal is employed in a particular manner to locate and support the respective members in proper relationship until a bond is effected.

There are many occasions in manufacturing operations where it is necessary to join metal or "metal-like" compound members by means of soldering, brazing, or welding operations or the like. Frequently the size or relative configuration of the metallic members is such that it is difficult to clamp them together or properly align them by external means throughout the entire joining operation. However, if the members are not clamped and should become misaligned during joining, it may then be necessary to perform subsequent machining operations or other processes to correct the misalignment.

It is an object of this invention to provide a method of metallurgically joining two members by employing a fusible filler metal, wherein the filler metal locates and maintains the members in proper relationship until the bond is effected.

It is a more specific object of this invention to provide a method of brazing two metallic members by providing the braze metal in a novel form suitable to maintain the two members in proper relationship until the braze bond is made.

It is a still more specific object of this invention to provide a method of brazing a wear-resistant foot member to the body portion of an internal combustion engine valve lifter wherein the braze filler metal is employed to support the foot member in coaxial relationship with respect to the tubular body portion until a braze bond is made.

In a specific preferred embodiment of my invention these and other objects are accomplished by providing a braze metal to be used in joining a wear-resistant foot member to a tubular body member of a valve lifter in such configuration that it may support the two members in proper coaxial relationship during the manufacturing process. By maintaining the members to be joined in coaxial relationship, finish grinding or machining operations may be eliminated. Thus, a suitable brazing alloy, such as for example a brass or a silver brazing alloy, may be provided in substantially disk form. The disk has a plurality of tangs at its periphery which are bent to project upwardly and downwardly from the plane of the disk. The diameter of the disk is adapted so as to coincide with the diameter of the wear-resistant foot member and the tubular body member. In this way the foot member and the tubular body member may be located within and supported by the tang projections of the alloy disk. The braze alloy is then heated to a suitable temperature wherein it melts and diffuses into the respective members to be joined. Subsequently, the joint is cooled and a strong braze bond is thus effected. At the conclusion, there is no misalignment of the wear-resistant foot member and the tubular body member which requires special grinding and machining operations after the assembly has been brazed.

A better appreciation of my invention will be gained after a more complete description thereof, reference being had to the drawings in which:

FIGURE 1 is an exploded view of the assembly comprising the wear-resistant foot member, a braze alloy member, and a tubular body portion member;

FIGURE 2 shows the assembly prior to the brazing operation; and

FIGURE 3 shows in section the completed brazed joint.

In a preferred embodiment, my process is applied in the manufacture of valve lifters. As is well known, valve lifters are employed in internal combustion engines to transmit motion from a cam to a tappet valve. One end of the valve lifter rides upon the cam and the other end is open, admitting a push rod. The push rod transmits motion from the valve lifter to a rocker arm which in turn opens a tappet valve in the engine cylinder. Referring to the figures of the drawing, 10 indicates the tubular valve lifter body portion. In a typical example, this member is open at the bottom (not shown), but is closed at the top end 12. This tubular body member is usually cold formed from an extrudable low-carbon steel such as SAE 1018 steel. Since the valve lifter is reciprocably operable in a bore within the engine crankcase, the outer cylindrical surface of the body portion 14 is generally case hardened to provide wear resistance. The end of the valve lifter structure which rides on the camshaft is provided with a wear-resistant facing or foot. This foot is indicated by 16. The foot member is of a highly wear-resistant material, such as tungsten carbide. In the prior art, the wear-resistant facing is formed to the tubular body member by brazing. Braze alloy powder is applied to the tubular member, the wear-resistant foot is placed in position, and the brazing operation accomplished to form the valve lifter. However, in the handling of the valve lifter assembly during the joining operation, it is not uncommon that the foot disk would slide out of alignment or be jarred out of alignment. Then, after the bond was formed between the misaligned members, it was necessary that a machining operation be employed to remove any of the wear-resistant surface which protruded over the tubular body member. As stated above, it is the purpose of my process to eliminate this problem in both the manufacture of valve lifters and any other joining operation in which a misalignment of the parts to be bonded would require a repair operation.

I provide the brazing alloy such as brass or silver alloy in the form of a thin disk. As shown in FIGURES 1 and 2, at the circumference of the disk is provided a number of upwardly 20 and downwardly 22 projecting tangs. These tangs are simply formed by introducing a series of short radially extending cuts from the circumference of the disk and then bending the enclosed portion either upwardly or downwardly. The distance between diametrically opposite tangs is determined by the diameter of the structure to be located therebetween. The diameter of the circular surface enclosed by the upwardly projecting tangs is equal to the diameter of the wear-resistant facing member 16. Similarly, the diameter of the circular area enclosed by the downwardly projecting tangs is suitably equal to the diameter of the tubular body member. As shown in FIGURE 1, the body member is provided with a relief portion 24, the dimensions of which are adapted so that the tangs of the braze alloy slide thereover. In most brazing operations the material which extends beyond the tangs as indicated at 26 will fall off during the brazing operation or may be quickly knocked off subsequent thereto. Alternatively, the tangs can be designed so that there is no such extending material.

Thus, in a brazing process in accordance with my invention, the brazing alloy is fitted over the relief portion 24 of the body member and the facing member 16 is fitted within the upwardly projecting tangs of the brazing alloy. The assembled structure is shown in FIGURE 2. In accordance with the invention, the brazing alloy thus may be used to both locate the wear-resistant facing and tubular member in proper relationship, and to maintain them in this relationship under normal jarring or handling until the braze joint is completed. An induction heating coil is located about the lifter assembly in the region of the braze alloy 18 or just below at the upper end 24 of the steel lifter body member 10. An alternating current in the coil induces eddy currents in the steel body and/or braze alloy which heat the braze alloy, fusing it and permitting it to diffuse into both the wear-resistant face portion and the tubular body portion. The coil is removed and the structure cooled to complete the strong braze joint 28. Of course, suitable heating means other than an induction coil may be employed to fuse the filler metal.

It will be apparent to those skilled in the art that the invention is not limited to brazing. It may be adapted to other joining operations, such as soldering and/or welding, in which a filler metal is used. Similarly, the members to be joined need not be circular in cross section. There will be instances in which noncircular mating surfaces will require a filler metal which may be suitably provided with a plurality of upwardly and downwardly extending tangs located at the periphery. The number, size, and shape of these projections will, of course, be determined in each given application.

The invention is used in connection with the formation of a metallurgical-type bond. The members to be joined may be elemental metals, alloys, or compounds having metallic properties, such as tungsten carbide. The use of the word "metallic" in the appended claims is intended to encompass all of these materials.

Thus, while may invention has been described in terms of a certain preferred embodiment, it is apparent that other forms could readily be adapted by one skilled in the art and the scope of my invention should be considered limited only by the following claims.

I claim:
1. A method of joining a first metallic member to a second metallic member by means of a metal filler member comprising the steps of providing said filler metal in sheet form having a plurality of upwardly and downwardly directed tangs located at its periphery, the configuration of said sheet conforming substantially to the surfaces of said metallic members which are to be joined, interposing said filler metal sheet between said first and second members in sandwich relationship employing said tangs to locate and maintain both of said members in a desired relationship, heating said filler metal to its fusion temperature, and subsequently solidifying said filler metal to effect a bond between said first and second members.

2. A method of brazing a first metallic member to a second metallic member, comprising the steps of providing a braze alloy in the form of a sheet having a plurality of upwardly and downwardly projecting tangs at its periphery, the configuration of said sheet conforming substantially to the surfaces of said members which are to be joined, interposing said braze sheet between said first and second members in sandwich relationship utilizing said tangs to locate and maintain both of said members in proper relationship until the brazing operation is completed, heating said braze alloy to an elevated temperature at which it melts and diffuses into said first and second members, and subsequently cooling said first and second members to obtain a bond therebetween.

3. In the manufacture of a valve lifter as used in an internal combustion engine comprised of a steel tubular body member and a tungsten carbide wear-resistant foot member, a method of brazing said foot member to said body member comprising the steps of providing a braze alloy in the form of a disk having a plurality of upwardly and downwardly projecting tangs at its circumference, interposing said braze disk between said wear-resistant foot member and said body member to form a sandwich-like assembly wherein said tangs support said foot and said body member in concentric alignment, heating said braze alloy to an elevated temperature at which said braze alloy melts and diffuses into said body and foot members, and cooling said assembly thereby bonding said foot and body members into an integral properly aligned valve lifter structure.

4. A method as in claim 3 wherein said valve lifter body member has a relief portion at the foot end thereof said relief portion being adapted to receive those tangs projecting towards said body member in said assembled relationship.

References Cited

UNITED STATES PATENTS

| | | | |
|---|---|---|---|
| 3,002,191 | 9/1961 | Thielsch | 29—501 X |
| 3,056,195 | 10/1962 | Hack | 29—501 X |
| 3,076,261 | 2/1963 | Christensen | 29—493 X |
| 3,372,464 | 3/1968 | Vincent | 29—473.1 |

JOHN F. CAMPBELL, Primary Examiner

J. L. CLINE, Assistant Examiner

U.S. Cl. X.R.

123—90; 228—56